United States Patent [19]

Pirkle

[11] Patent Number: 5,454,184
[45] Date of Patent: Oct. 3, 1995

[54] ADJUSTABLE OUTRIGGER RELEASE CLIP FOR SPORTFISHING

[75] Inventor: Fred L. Pirkle, Abington, Pa.

[73] Assignee: Texan Corporation, Horsham, Pa.

[21] Appl. No.: 330,209

[22] Filed: Oct. 27, 1994

[51] Int. Cl.$^6$ .................................................. A01K 91/00
[52] U.S. Cl. ............................................................ 43/43.12
[58] Field of Search ........................... 43/43.12, 43.1, 43/43.13, 27.2, 27.4; 114/247, 249

[56] References Cited

U.S. PATENT DOCUMENTS

| | | | |
|---|---|---|---|
| 2,838,866 | 6/1958 | Labin | 43/43.12 |
| 3,879,884 | 4/1975 | Tucker, Sr. | 43/43.12 |
| 3,905,148 | 9/1975 | Naone et al. | 43/43.12 |
| 3,930,330 | 1/1976 | Black | 43/17 |
| 4,428,142 | 1/1984 | Shedd et al. | 43/43.12 |
| 4,574,516 | 3/1986 | Shedd et al. | 43/43.12 |
| 4,574,518 | 3/1986 | Shedd et al. | 43/43.12 |
| 4,611,423 | 9/1986 | Rupp | 43/43.12 |
| 4,856,224 | 8/1989 | Fincher, Sr. | 43/43.12 |
| 5,107,616 | 4/1992 | Ryder | 43/43.12 |
| 5,170,581 | 12/1992 | Lyons | 43/27.4 X |

*Primary Examiner*—Mark Rosenbaum
*Assistant Examiner*—Jeanne M. Elpel

[57] ABSTRACT

A fishing release clip comprises a body and a stem fastened respectively to opposite ends of an outrigger line on a sportfishing boat. An individual fishing line is retained in a hook shaped element on the body of the clip by a pin which forms part of the stem. The stem is held in its line-retaining position by a set of detent balls which surround a pin having an annular groove. The grooved pin is spring-loaded by a coil spring, the compression of which can be adjusted by a micrometer-type thimble. When a fish strikes at the bait on the end of the fishing line, the force exerted by the fishing line on the release clip causes the outrigger line to pull the pin so that it moves against the spring force until the groove comes into register with the detent balls, whereupon the balls move into the groove and allow the stem to move to release the fishing line. The release clip can also be opened, in a similar way, by manual force exerted on the outrigger line.

13 Claims, 3 Drawing Sheets

5,454,184

ADJUSTABLE OUTRIGGER RELEASE CLIP FOR SPORTFISHING

BACKGROUND OF THE INVENTION

This invention relates generally to sportfishing, and more particularly to improvements in release clips of the kind used to support fishing lines from an outrigger pole.

In ocean sportfishing, it is common for a single boat to put multiple lines out through the use of outrigger poles. Outrigger poles are long poles that extend from various positions on the boat and spread the fishing lines apart from one another. The poles are typically made of aluminum and each pole has a ¼ inch nylon outrigger line fed over pulleys located at the inner and outer ends of the pole. The ends of the outrigger line are both connected to a device known as an "outrigger release clip" so that the clip can be moved from a location near the outer end of the pole to an accessible location above or adjacent to the deck of the fishing boat. The arrangement of outrigger poles and release clips helps properly position the fishing lines, keeps them from becoming twisted or fouled, and simplifies the task of setting out the lines. When a fish strikes the bait at the end of a fishing line, ideally the clip releases the line so that it becomes slack for a time. This allows the bait to remain stationary in the water so that the fish, after making the initial strike, is more likely to come back to swallow the bait.

An ideal release clip would allow the attachment of the fishing line with only one hand, so the other hand can be used to steady the fisherman on the boat; would not twist in such a way as to foul up the fishing line; would be easily and repeatably adjustable to a desired tension to facilitate the capture of fish striking with different forces; would transfer the strike force to the release clip in such a way that the force applied to the release mechanism accurately corresponds to the striking force; and could be unfastened readily by a single jerk on the outrigger line.

One form of release clip is disclosed in U.S. Pat. No. 3,905,148 to Phillip L. Naone et al. This release clip comprises a clothespin-shaped device with a pair of legs that capture a rotatable and releasable sheave. The fishing line is threaded around the sheave and the device is run up the outrigger pole on a outrigger line. When a fish strikes, the sudden pulling force causes the sheave to pop out from between the legs of the clip, releasing the line so that it can be controlled by directly by the fisherman through his fishing rod. This device has the disadvantage that, when a strike of sufficient force occurs, the sheave pops out and is lost permanently. The device must then be hauled in for replacement of the sheave.

Another form of release clip is described in U.S. Pat. No. 3,930,330 to Albert D. Black. This clip has a pivoted release arm held between a pair of arms to which tension is applied by an adjusting nut. The adjusting nut is twisted to set the device to a desired tension.

Still another form of outrigger release clip is disclosed in U.S. Pat. Nos. 4,428,142, 4,574,516 and 5,574,518 to W. D. Shedd et al. The clip has a U-shaped arm pivoted to a body to define a cavity between the arm and body. A V-shaped roller is journaled in the arm so that a fishing line extending through the clip between the arm and body rides friction-free over the roller. A latch member spanning the arm and body has a cam element engaging the free end of the pivoted arm and resiliently presses against the pivoted arm to provide an adjustable force that resists pivotal release of the arm and of the tensioned fishing line entrained over its roller. With this device, it can become very awkward to attach the clip to the outrigger line and to attach the fishing line into the clip. In this device, there is no way to know how much tension is applied by the adjusting nut to the pair of arms.

Finally, still another form of outrigger clip is disclosed in U.S. Pat. No. 4,611,423 to Rupp. This device is attached to the free ends of an outrigger line and holds the fishing line on a V-shaped roller. The roller is positioned on a rotatable shaft that is pivotable between a line-retaining or line-releasing position. Detent members frictionally engage a release lug and may be twisted to increase or decrease line-release pressure.

In each of the patented devices described above, there is no way to release the fishing line manually without whipping a rod tip violently or hauling in the clip on the outrigger line, and it is difficult to set the device accurately to a desired tension.

SUMMARY OF THE INVENTION

The clip in accordance with this invention has jump rings at its opposite ends, for attachment to the free ends of an outrigger line. One of the jump rings is attached to a tip end of a hook body, a two-ended piece that includes a cup-shaped element having an aperture therein, at one end, with a closure cap threaded onto it, and, at the opposite end, a hooking element in the form of an elbow for providing a restrictive surface for a fishing line. A movable release pin means slides inside the cup-shaped element. The release pin means includes, at its forward end, a semi-circular pin for movement through the aperture and engagement with the hooking element and, at the opposite end, a tubular section with at least one ball inside a ball opening spaced from the forward end. The tubular section carries a plurality of gradation rings and a rotatable micrometer adjustment thimble. An elongated scale rod, attached at one end to the second jump ring, fits inside the movable release pin means. The rod is formed in two sections: a first section of a predetermined diameter with a ball-receiving groove around it to form a camming surface thereon, and a second section, of a smaller diameter than the first, with a spring wrapped around it. The spring places tension on the rod, urging it into the tubular section of the release pin. The rod maintains the balls so that they protrude from their radial openings, thereby holding the semi-circular pin in a closing relationship with the hooking element. Upon the application of a predetermined tension on the outrigger line/fishing line combination, the cam surface moves to allow the ball to fall into the groove adjacent to the camming surface so that the release pin retracts allowing the fishing line to slip free. The predetermined tension can be adjusted by rotation of the micrometer thimble.

The principal object of this invention is to provide a release clip in which the fishing line can be released automatically when a fish strikes the bait, and also manually by a pull on the outrigger line.

Another object of the invention to provide an adjustable fishing release clip wherein a micrometer adjustment thimble is used to set a predetermined amount of release tension into the device.

It is another object of the invention to provide a release clip in which the components work in line with one another for simplicity of design.

It is still another object of the invention to provide a release clip that incorporates a scale to measure the force exerted on the outrigger/fishing line combination so that the release tension can be repeatably set.

It is still another object of the invention to provide a release clip that can be easily installed and used on a sportfishing boat while said boat is engaged in competitive fishing.

It is still a further object of the invention to provide a release clip which resists snagging and breaking of the fishing line.

Further objects, details and advantages of the invention will be apparent from the following detailed description, when read in conjunction with the drawings.

DETAILED DESCRIPTION

In sportfishing competition, a single boat will often put out as many as eight fishing lines at one time and use outrigger poles, downriggers or the like, to separate the individual lines and keep them from getting tangled with one another. Each individual fishing line is hooked into a device known as a release clip, attached onto the outrigger line, so that when a fish strikes, all of the other fishing lines can be quickly racked in to get them out of the way. Release clips should be easy to operate, preferably with only one hand, and must be constructed in such a manner that they will automatically react at a preset tension to release the fishing line.

Figure 1:
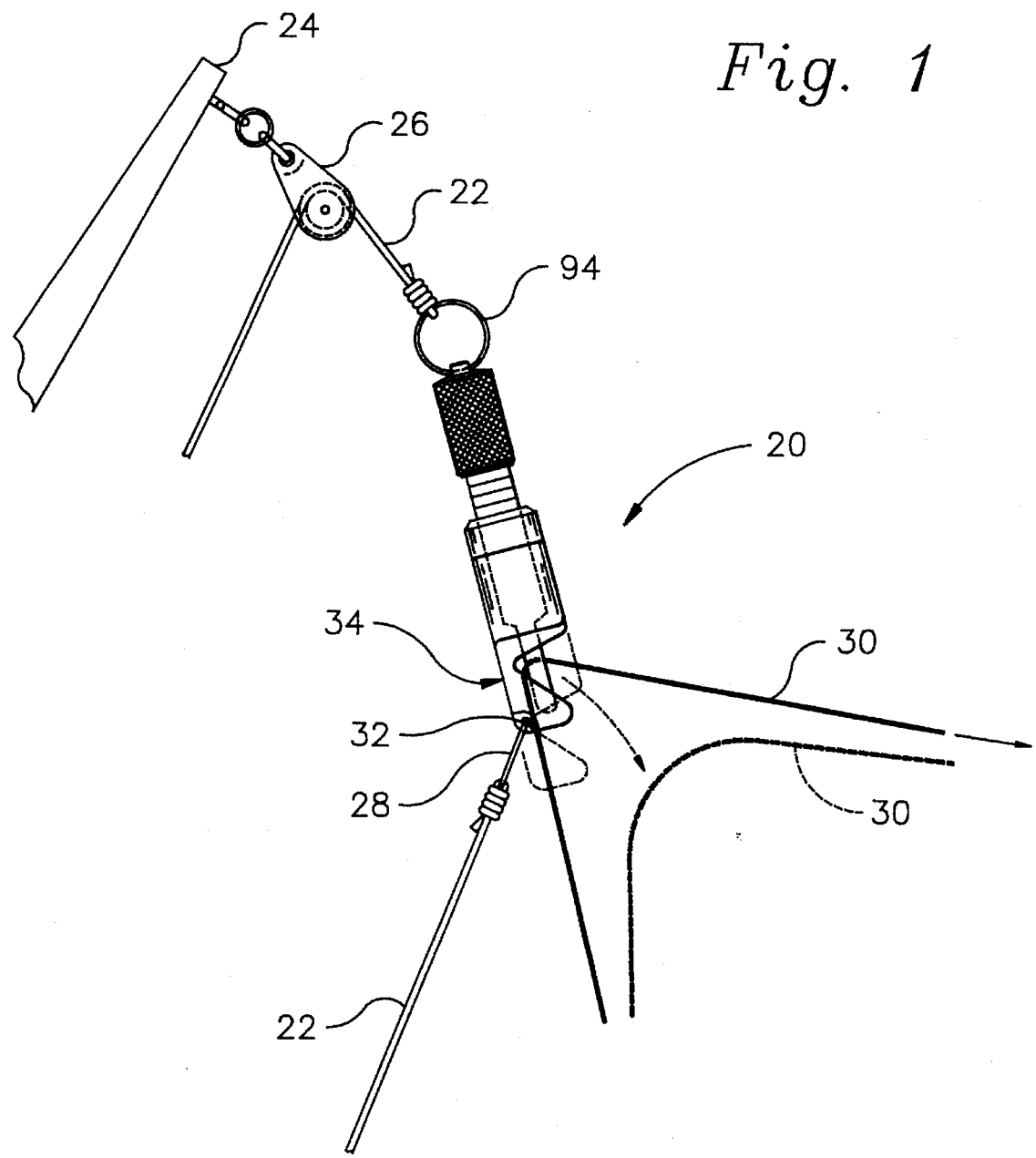
FIG. 1 is an elevational view of a release clip on the outrigger line of one of the outrigger poles (only partially shown) of a sportfishing boat (not shown), showing a fishing line captured and, in phantom, after release.

In FIG. 1, one end of outrigger line 22 passes over a pulley 26 at the top end of outrigger pole 24, and is tied into a jump ring 94 connected to a pin in a stem of release clip 20. The outrigger line 22 passes over another pulley (not shown) located near the opposite end of the outrigger pole, and extends back up to the release clip 20, where its other end is connected through a jump ring 28 directly to a hook body 34 of clip 20, at hole 32 in hook body 34. A fishing line 38 is shown captured in hook body 34, and is shown in phantom after release.

Figure 2:
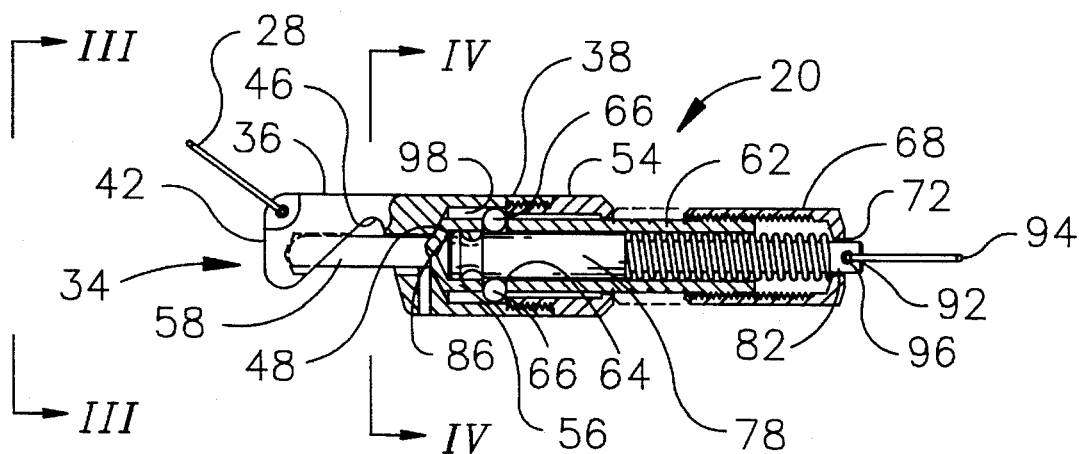
FIG. 2 is a side elevation, partially in section, of the release clip in the closed and locked position.
Figure 3:
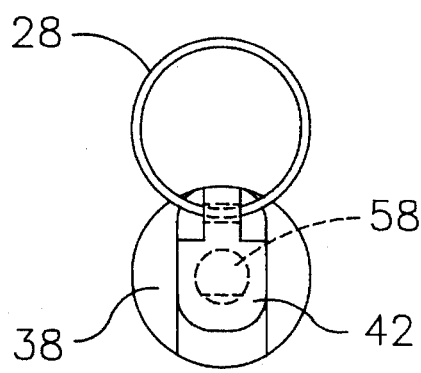
FIG. 3 is an end view, as seen through plane III—III of FIG. 2, showing the hook end of the release clip.
Figure 4:
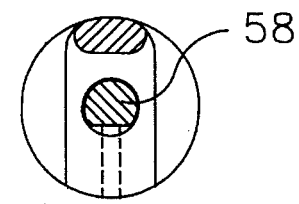
FIG. 4 is a cross-section, taken on plane IV—IV of FIG. 2, showing the hook end of the release clip.
Figure 5:
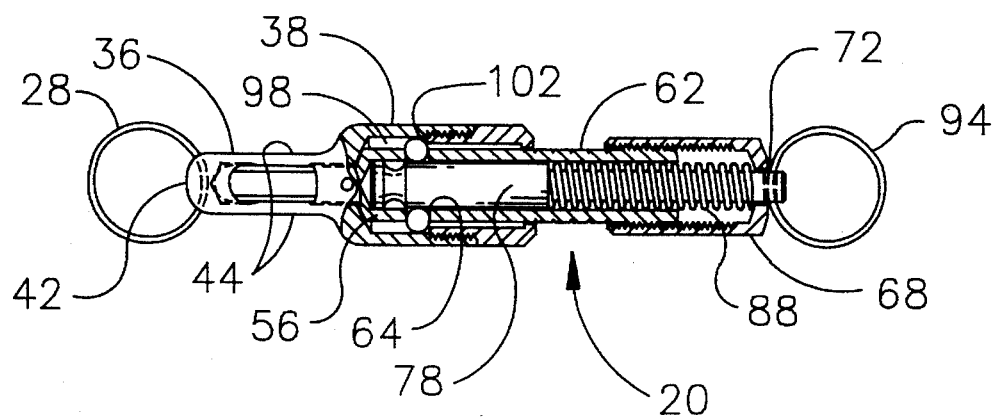
FIG. 5 is a bottom plan view, partially in section, of the release clip of FIG. 2.

As shown in FIGS. 2–5, the hook body 34, at one end of the release clip 20, comprises a notched, rectangular-shaped element 36 joined to a cup-shaped element 38 having an aperture in its bottom portion 48. Element 36 has oppositely-disposed elongated sides 44, and, as can be seen in FIG. 2, element 36 has a cavity, in the shape of a V-notch, carved out of the elongated sides 44 to present a line restricting surface 46. Cup-shaped element 38 has side walls extending from its bottom portion 48 to form an open area for other components. A closure cap 54, in the form of a tubular section, is threaded to element 38. Cap 54 has a turned-in edge, at the end opposite from its threads.

A stem or release pin, in the form of a spindle 56, comprises a semi-circular pin 58 (See FIGS. 3 and 4) that slides through the aperture in bottom portion 48. It also comprises a tubular part 62 that fits inside element 38. Pin 58 is made with a flattened side to prevent rotation of spindle 56. Tube 62 has, at the end near pin 58, at least one radial aperture 64 that holds a detent ball 66. A typical detent ball is approximately 1/8 inch in diameter. At the end opposite from the radial aperture, a rotatable micrometer adjustment thimble 68 is threaded onto tube 62. Thimble 68 has an aperture 72 in its end.

A pin is slidable in tube 62. This pin is in the form of a rod having a part 78 of a first diameter adjacent to the radial ball apertures 64 and a part 82 of a smaller diameter. Part 78 has a groove 86 adjacent to apertures 64. Part 82 has a coil spring 88 wound around it, in compression between the inside of thimble 68 and a shoulder at which parts 78 and 82 meet. An end 92 of part 82 extends through aperture 72 of thimble 68, and a second jump ring 94 is inserted through a hole 96 in end 92.

Figure 8:
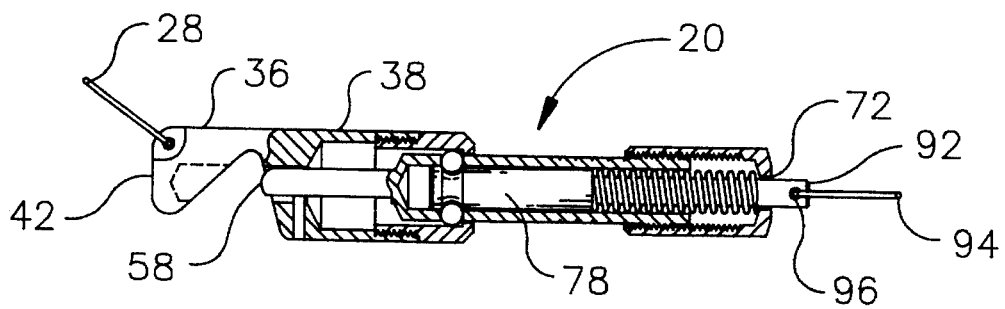
FIG. 8 is a side elevation, partially in section, of the release clip in the opened condition.

In the operation of the device just described, the release clip is attached to both ends of an outrigger line 22 with release pin 56 withdrawn as shown in FIG. 8. A fishing line 30 (FIG. 1) is positioned against line-restricting surface 46. The pin assembly, including part 78, is pushed into tube 68, thereby driving pin 58 into engagement with end 42 and trapping line 30. When the detent balls pass beyond the shoulder formed by the end of cap 54, pin 78 is urged leftward by spring 88, from the position depicted in FIG. 6 to the position depicted in FIGS. 2 and 5. The pin 78 acts as a cam, forcing the balls outward from groove 86 into space 98, where they are engaged with the shoulder of cap 54. Clip 20 is then hoisted up outrigger pole 24 and the bait is set. The release action is initiated when a tension is placed either on fishing line 30 or on outrigger line 22, or both.

Before hoisting the device up the outrigger pole, the tension at which release will take place can be set by rotation of thimble 68. Gradation rings 104 (See FIG. 6) are exposed to show the amount of tension placed on spring 88.

Figure 6:
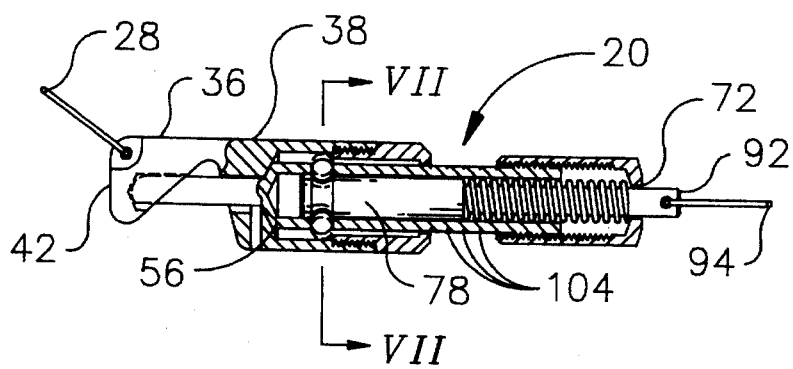
FIG. 6 is a side elevation, partially in section, of the release clip in the closed but unlatched condition.
Figure 7:
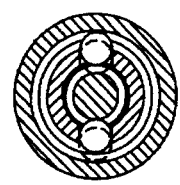
FIG. 7 is a cross-sectional view, taken on plane VII—VII of FIG. 6.

As more and more force is applied, either through the fishing line or through the outrigger line 22, spring 88 is compressed against the end of thimble 68 and groove 86 run moves axially until it is in register with the radial passages holding the detent balls, as shown in FIG. 6. The balls are able to move radially inward to clear the end of cap 54. This allows the spindle 56 to move to the position depicted in FIG. 8. Pin 58 retracts and clears end 42, allowing the fishing line 30 to slip free, as shown in phantom in FIG. 1.

Figure 9:
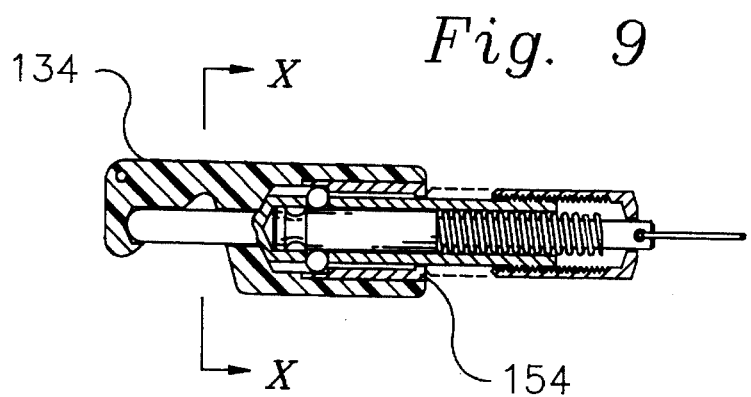
FIG. 9 is a side elevation, partially in section, of an alternate embodiment of the release clip.
Figure 10:
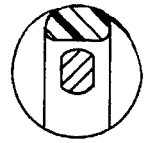
FIG. 10 shows a cross-sectional view, taken on plane X—X of FIG. 9.

In the primary embodiment of the micrometer release clip, all components can be made from stainless steel or other suitable materials. FIGS. 9 and 10 show an alternative embodiment in which selected parts may be made from ABS (acrylonitrile-butadiene-styrene) or like plastics materials, which decrease the weight of the clip. For instance, as shown in FIG. 9, a side elevation similar to FIG. 2, the hook body 134 can be made from plastics material. In this embodiment, a metal insert 154 is used instead of closure cap 54.

Many other modifications will occur to persons skilled in the art and can be made without departing from the scope of the invention as defined in the following claims.

I claim:

1. An outrigger release clip for sportfishing attachable to an outrigger line to support a fishing line and, after weighing the force on the fishing line and comparing said force to a predetermined limit, releases said fishing line after said limit has been exceeded, comprising:

a hook body having, at a first end, a cup-shaped element with walls and a bottom portion with an aperture therethrough and having a closure cap removably attached to the walls, and, at the opposite, distal end, hooking means for providing a fishing-line-restricting surface;

movable release pin means, slidingly positioned inside the cup-shaped element for providing a movable release pin to cooperate with the hooking means to restrict a fishing line; and stem means, in the form of an elongated rod that slidingly moves inside the movable release pin means and has a camming surface thereon and provides a spring-restricting surface for a spring adjacent thereto.

2. An outrigger release clip as described in claim 1 wherein said hooking means comprises a notched, rectangular-shaped element with attachment means for attaching the outrigger line thereto.

3. An outrigger release clip as described in claim 1 wherein said movable release pin means comprises an non-circular anti-rotation pin body, at a forward end, for extending through the aperture to a position adjacent the hooking means, and a two-ended tubular section having, proximate the pin body, at least one ball opening to receive a positioning ball, and attached at the distal end a rotatable adjustment thimble.

4. An outrigger release clip as described in claim 1 wherein said stem means comprises an elongated rod having two sections with the first section having a first, larger diameter and being adjacent the ball opening and the second section, being of a smaller diameter than the first section, having a second attachment means therein.

5. An outrigger release clip as described in claim 2 wherein said closure cap comprises a tubular section having a rim around the inside of one end and threads around the outer surface at the opposite end.

6. An outrigger release clip as described in claim 3 wherein said rotatable thimble is threadedly attached.

7. An outrigger release clip as described in claim 1 wherein the movable release pin carries gradation rings.

8. An outrigger release clip as described in claim 3 wherein as increased force is applied to the fishing line and the outrigger line, said positioning ball moves into the at least one ball opening.

9. An outrigger release clip for sportfishing attachable to an outrigger line to support a fishing line comprising:

a body having first and second ends and an internal passage extending from the first end to the second end, and means, extending from said first end, providing a fishing line-engaging surface;

a stem extending axially through said passage and cooperable with said line-engaging surface to provide a closeable and openable line-retaining passage, said stem being axially movable to release a fishing line retained in the line-retaining passage;

first connecting means on said body for connection to a first end of said outrigger line;

second connecting means on said stem for connection to a second end of said outrigger line;

means for preventing separation of said stem from said body while permitting sufficient axial movement of the stem relative to the body to open the line-retaining passage to allow release of said fishing line;

latching means, comprising cooperating elements on said stem and on said body, for releasably holding said stem in relation to said line-engaging surface to maintain said line-retaining passage closed; and means responsive to the force exerted by said second end of said outrigger line on said second connecting means for effecting release of said latching means when said force reaches a predetermined level;

whereby the latching means may be released to open the line-retaining passage to permit release of the fishing line from the line-retaining passage either by a force exerted by a fish on the fishing line, or by a manual force exerted on the outrigger line connected to said first and second connecting means.

10. An outrigger release clip according to claim 9 in which the first connecting means is connected directly to said means, extending from said first end, providing a fishing line-engaging surface.

11. An outrigger release clip according to claim 9 in which said stem has an internal passage, and having a pin extending into said internal passage of the stem, radial passages in said stem, and detent balls in said radial passages, and in which said internal passage of the body has a retaining surface engageable with the balls for holding said stem in relation to the line-engaging surface to maintain said line-retaining passage in its closed condition, the pin having an outer surface engageable with said detent balls for causing the balls to extend outward from the stem into engagement with said retaining surface on the internal passage of the body, and groove means in said pin for receiving said detent balls so that, when the pin moves axially to a location in which the groove means is in register with the radial passages, and spring means urging said pin axially so that the groove means is out of register with the radial passages, the second connecting means being connected directly to said pin, and the groove means in the pin being positioned relative to the radial passages so that the groove is out of register with the radial passages when no force is applied to the second connecting means, and so that the groove is moved into register with the radial passages when a predetermined pulling force is applied to said second connecting means by an outrigger line connected to the second connecting means.

12. A outrigger release clip according to claim 11 including adjustable means for setting the tension in said spring means.

13. A outrigger release clip according to claim 11 including a cap threaded onto said stem and a shoulder on said pin, and in which said pin extends through a hole in said cap, and said spring means comprises a coil spring surrounding a portion of said pin and held in compression between said shoulder and said cap, and in which the tension on said spring can be adjusted by rotation of said cap.

* * * * *